United States Patent [19]
Kaipainen

[11] Patent Number: 5,671,761
[45] Date of Patent: Sep. 30, 1997

[54] VEHICLE WASH SYSTEM WITH SHUT-OFF SWITCH ACTIVATED BY THE WASH MEDIUM

[75] Inventor: Pasi Kaipainen, Ann Arbor, Mich.

[73] Assignee: InterClean Equipment, Inc., Ann Arbor, Mich.

[21] Appl. No.: 663,353

[22] Filed: Jun. 13, 1996

[51] Int. Cl.$^6$ ........................................... B08B 3/02
[52] U.S. Cl. ................ 134/57 R; 134/45; 134/123; 134/113; 239/63
[58] Field of Search ............... 134/45, 123, 198, 134/201, 56 R, 57 R, 58 R, 113; 239/63

[56] References Cited

U.S. PATENT DOCUMENTS

| | | | |
|---|---|---|---|
| 3,079,935 | 3/1963 | Padek | 134/45 |
| 3,259,138 | 7/1966 | Heinicke | 134/45 |
| 3,533,395 | 10/1970 | Yaste | 134/45 |
| 3,578,001 | 5/1971 | Attaway | 134/45 |
| 3,750,950 | 8/1973 | Whitener | 239/63 |
| 3,915,185 | 10/1975 | Sanner | 239/63 |
| 5,269,337 | 12/1993 | Goldsmith | 239/63 |

FOREIGN PATENT DOCUMENTS

| | | | |
|---|---|---|---|
| 2745551 | 4/1978 | Germany | 134/45 |

*Primary Examiner*—Frankie L. Stinson
*Attorney, Agent, or Firm*—Harness, Dickey and Pierce, P.L.C.

[57] ABSTRACT

A vehicle wash system having a nozzle for directing a spray of a fluid wash medium at a vehicle for washing the vehicle in which, after the vehicle has passed the spray path, the fluid spray contacts a switch on the opposite side of the vehicle wash that is aligned with the spray path to actuate the switch. The switch is used to shut-off the fluid spray.

8 Claims, 2 Drawing Sheets

VEHICLE WASH SYSTEM WITH SHUT-OFF SWITCH ACTIVATED BY THE WASH MEDIUM

BACKGROUND AND SUMMARY OF THE INVENTION

The present invention relates generally to a vehicle wash system and in particular to a wash system in which the spray of the wash medium is used to operate a switch by contact with the switch.

An important aspect of automated vehicle wash systems is the control system for starting and stopping the various components of the wash system. It is necessary to have a control system which detects the presence of a vehicle at various stages in the wash system to start various cleaning equipment and fluid sprays in the vehicle wash. Likewise, it is necessary to detect the end of the vehicle to stop the equipment and fluid sprays once the vehicle has passed. Various devices have been developed for detecting both the front as well as the rear of a vehicle. One device utilizes a limit switch having a wand that extends into the path of a moving vehicle. The switch detects the presence of a vehicle by contact of the wand with the vehicle. Such a device is very effective in starting a fluid spray or equipment operation upon initial contact of the vehicle with the switch wand. However, precise deactivation of equipment and sprays is harder to achieve. Deactivation occurs after the vehicle passes and the wand is allowed to return back to its normal, non-engaged, position. However the return of the wand is affected by the vehicle width and thus, less effective in precisely terminating a fluid spray.

Other devices have been used such as an electronic eye, an ultrasonic sensor, radar, etc. These devices work well in detecting the initial presence of a vehicle for activation of equipment. However, in an environment where fluid is being sprayed at high pressure, it is difficult to keep the lenses of such devices clean. In addition, the fluid spray can also "cloud" the environment in the vehicle wash blocking the path across the vehicle wash required by some sensors. Thus, such electronic devices are better suited for detecting the initial presence of a vehicle rather than the passing of the vehicle. In addition, such sensors are expensive compared to the mechanical wand switches described above.

Due to the disadvantages with the above devices for terminating a fluid spray in a vehicle wash, there is a need for an inexpensive and precise devices for terminating a flush spray in a vehicle wash.

Accordingly, it is an object of the present invention to provide a precise means for deactivating a fluid spray upon the passing of the vehicle from the path of the spray.

The present invention provides a control switch in line with a fluid spray path so that the spray contacts the switch to activate or deactivate the switch. This can be used to shut-off the fluid spray once the vehicle has passed the spray path by placing the switch on the opposite side of the vehicle wash from the spray nozzle. The vehicle blocks the fluid spray while the vehicle is being washed by the fluid. Once the vehicle has passed the spray path, the wash medium fluid spray, contacts the switch to place the switch in the off mode to shut-off the fluid spray. It is an advantage of such a device that the switch itself can be a low cost limit switch as opposed to the more expensive electronic sensors. It is a further advantage of such a switch that the deactivation of the wash medium spray can be precisely coordinated with the passing of the vehicle from the spray path.

The use of the wash medium to deactivate the spray can be utilized regardless of the direction of the fluid spray. It can be used in sprays directed either horizontally or vertically across the vehicle wash path.

In one embodiment, a plurality of nozzles may be directed at a given vehicle surface and controlled by a single switch. The spray nozzle that is aligned with the switch may be positioned to slightly trail the other nozzles so that when the switch is deactivated and the spray is ceased, the trailing edge of the vehicle surface is passing the spray paths of the other nozzles.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
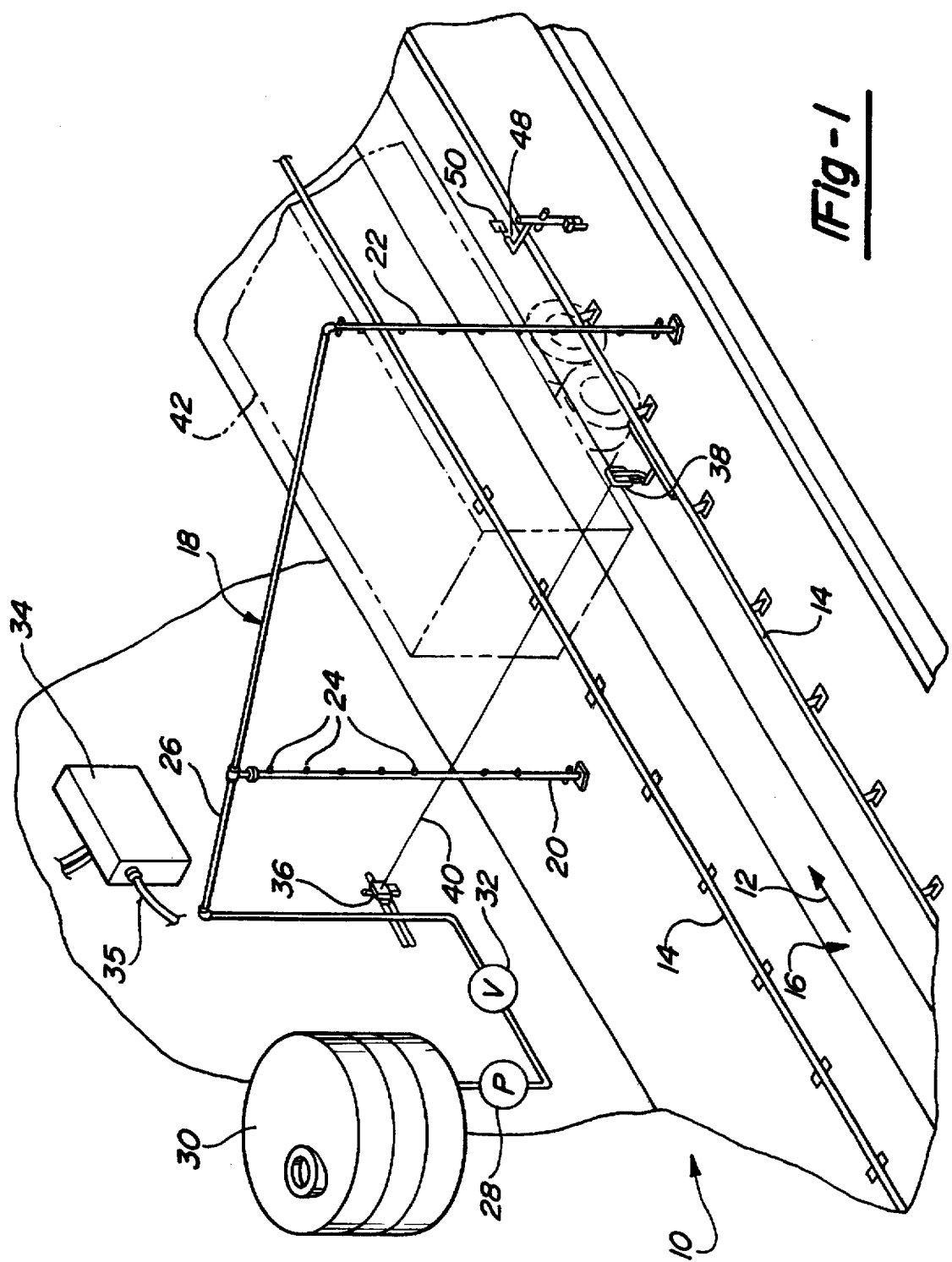
FIG. 1 is a perspective view of a vehicle vehicle wash having a fluid spray activated shut off switch according to the present invention.
Figure 2:
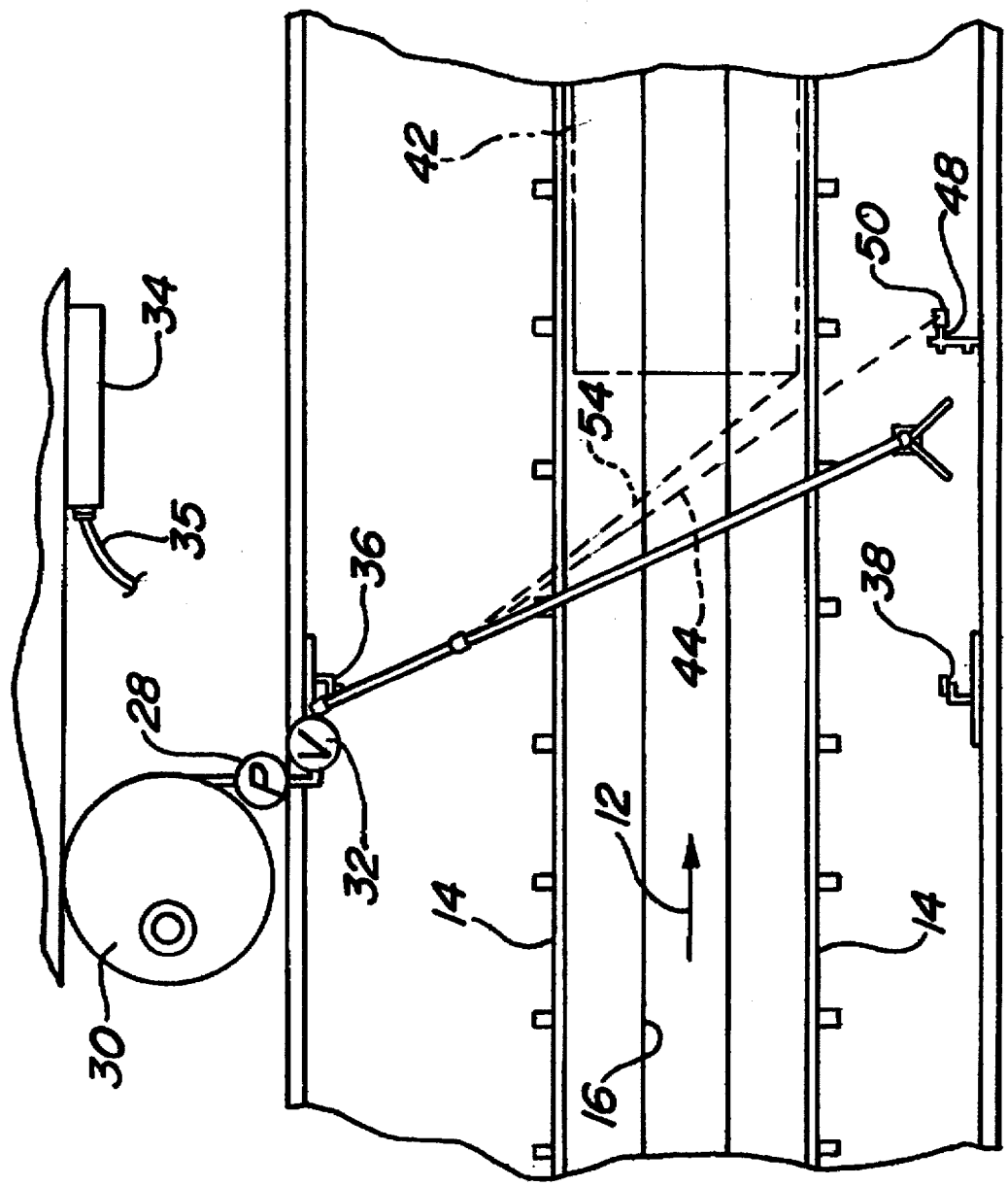
FIG. 2 is a top plan view of the vehicle wash shown in FIG. 1.

A portion of a vehicle wash system having a fluid activated shut-off switch is shown in FIGS. 1 and 2 and designated generally at 10. The vehicle wash system has a vehicle path of travel indicated by the arrow 12. The vehicle path is defined by a pair of tire guides 14 between which the vehicle travels. Along the vehicle path 12 is a center trough 16 which collects dirt, water, soap, wax, etc. for subsequent treatment.

Along the vehicle path is an arch 18 having a pair of upright columns 20 and 22. The upright column 20 has a plurality of nozzles 24. The column 20 and nozzles 24 receive a supply of a fluid wash medium through a pipe 26. The pipe 26 is connected to a pump 28 which receives the fluid from a storage tank 30. A valve 32 is provided between the pump and the supply pipe 26. The pump and valve are controlled by a wash system controller 34. Controller 34 controls the overall operation of the wash system including the activation of the pump and opening and closing of the valve 32 to supply the wash medium to the nozzles 24. The controller 34 is coupled to the pump, valve, switches, sensors, detectors, etc. via wires contained in a cable 35. Other valves may be provided to supply the wash medium to other nozzles (not shown) in a conventional manner for washing vehicles. The above described pump, valve and tank form a pump means for supplying the fluid wash medium to the nozzles. This combination of elements is only one example of many other elements which can be used to supply the wash medium. The invention is not limited to this specific combination of tank, pump and valve.

The pump means is activated to initiate fluid spray from the nozzles 24 by a sensor comprised of a transmitter 36 and a detector 38 on opposite sides of the vehicle path of travel. When a vehicle passes between the transmitter and detector, the transmitted beam 40, is interrupted indicating the presence of a vehicle and the need to initiate the spray of the wash medium from the nozzles 24. In the illustrated embodiment, the nozzles 24 are directed across the vehicle path 12 and downstream in the direction of travel along the vehicle path 12. This enables the fluid spray to contact the rear surface of the vehicle 42, a truck trailer, in the illustration.

The nozzles 24 direct the wash medium along a spray path 44. Due to the high pressure of the fluid spray from the nozzles 24, it is desirable to terminate the spray immediately upon the passing of the vehicle rear surface 46 from the spray path 44. According to the present invention, a shut off switch 48 is positioned on the opposite side of the vehicle path 12 from the nozzles 24. The switch 48 is aligned with the spray path 44 such that the fluid from one of the nozzles 24 contacts the switch 48 once the vehicle has passed from the spray path.

The shut off switch 48 has on and off modes for operation of the pump means. The switch is biased to the "on" mode which is required for operation of the pump means. Upon the passing of the vehicle from the spray path, the wash medium sprayed from one of the nozzles 24 contacts the paddle 50 of the switch 48 to place the switch in the "off" mode to shut off the pump means and stop the spray of the wash medium from the nozzles 24. The switch 48 can be a low cost limit switch which, when coupled with the spray medium to place the switch in the "off" mode, provides a precise and inexpensive system to deactivate the fluid spray once the vehicle has passed. The paddle 50 is mounted to an operating lever 52 of the switch which moves between two positions corresponding to the on and off modes of the switch. Other types of switches can be used such as a pressure switch that does not have a moving lever, but has a pressure pad that is activated by the fluid spray.

in an alternative embodiment, all but one of the spray nozzles 24 are oriented to direct the fluid spray along spray paths 54 which are down stream from the spray path 44. The vehicle will pass the spray path 44 first. This enables the switch 48 to be deactivated and the pump means stopped just as the spray paths 54 from the other nozzles contact the trailing edge of the surface being washed.

The wash system of the present invention thus provides an economical and precise way to deactivate a fluid spray. It does so by providing a shut off switch aligned with the fluid spray to be deactivated once the vehicle has passed the spray path.

As described above, the fluid spray contacts the switch to shut-off the fluid spray following the passing of the vehicle to be washed. However, the concept of utilizing the wash medium to activate a switch can be used for purposes other than terminating the fluid spray following the passing of a vehicle. For example, a vertical column of spray nozzles and a corresponding column of switches opposite the vehicle path from the nozzles could be used to measure the approximate height of a passing vehicle. This height data could be used either to shut off nozzles above the vehicle that are not needed or to position subsequent cleaning equipment further along in the vehicle wash. Thus, in its broadest sense, the invention pertains to the use of the wash medium spray to actuate a switch.

It is to be understood that the invention is not limited to the exact construction illustrated and described above, but that various changes and modifications may be made without departing from the spirit and scope of the invention as defined in the following claims.

I claim:

1. In a vehicle wash system defining a path of travel for a vehicle to be washed and having a spray nozzle for directing a wash medium along a spray path at a vehicle moving along the vehicle path of travel, pump means for selectively supplying the wash medium to the nozzle and control means for actuating the pump means, the improvement comprising a shut-off switch in said control means having on and off modes corresponding to on and off modes for the pump means, the switch being biased to the on mode wherein the pump means supplies the wash medium to the nozzle and the switch being located opposite from the spray nozzle along the spray path such that the vehicle traveling along the vehicle path of travel passes between the nozzle and the switch intersecting the spray path and after the vehicle has passed the spray path, the impact of the spray of wash medium from the nozzle contacting the switch places the switch in the off mode to stop the pump means and thereby stop the spray of the wash medium from the nozzle.

2. The vehicle wash system of claim 1 wherein the shut-off switch has an operating lever movable between two positions to place the switch in the on and off modes respectively, the operating lever being acted upon by the wash medium spray to move the operating lever to the position corresponding to the off mode of the switch.

3. The vehicle wash system of claim 2 further comprising a paddle carried by the operating lever, the paddle being aligned with the spray path to provide a surface for engagement by the wash medium to move the lever.

4. A vehicle wash system comprising:

means for defining a path of travel for a vehicle to be washed;

a first spray nozzle for directing a wash medium along a first spray path at a vehicle moving along the vehicle path of travel;

pump means for selectively supplying the wash medium to the first spray nozzle; and control means for actuating the pump means, the control means including a shut-off switch having on and off modes corresponding to on and off modes for the pump means, the switch being biased to the on mode wherein the pump means supplies the wash medium to the first spray nozzle and the switch being located opposite from the first spray nozzle along the spray path such that the vehicle traveling along the vehicle path of travel passes between the first nozzle and the switch intersecting the spray path and after the vehicle has passed the first spray path, the impact of the spray of wash medium from the first spray nozzle contacting the switch places the switch in the off mode to stop the pump means and thereby stop the spray of the wash medium from the first nozzle.

5. The vehicle wash system of claim 4 wherein the shut-off switch has an operating lever movable between two positions to place the switch in the on and off modes respectively, the operating lever being acted upon by the wash medium spray to move the operating lever to the position corresponding to the off mode of the switch.

6. The vehicle wash system of claim 5 further comprising a paddle carried by the operating lever, the paddle being aligned with the spray path to provide a surface for engagement by the wash medium to move the lever.

7. The vehicle wash system of claim 4 further comprising a plurality of additional spray nozzles each coupled to the pump means for receiving the wash medium simultaneously with the first spray nozzle, the additional spray nozzles directing additional sprays of wash medium along additional spray paths that are further down the vehicle path of travel than the first spray path whereby the vehicle passes the first spray path before the vehicle passes the additional spray paths.

8. In a vehicle wash system defining a path of travel for a vehicle to be washed and having a spray nozzle for directing a wash medium along a spray path, pump means for selectively supplying the wash medium to the nozzle and control means for actuating the pump means, the improvement comprising a switch in said control means having on and off modes and the switch being located along the spray path such that the impact of the spray of wash medium from the nozzle contacting the switch to changes the switch from one mode to the other.

* * * * *